United States Patent
Gebauer et al.

(10) Patent No.: US 12,169,034 B2
(45) Date of Patent: Dec. 17, 2024

(54) METHOD FOR PRESSURE CONTROL IN CROSSFLOW FILTRATION

(71) Applicant: Cytiva Sweden AB, Uppsala (SE)

(72) Inventors: Klaus Gebauer, Uppsala (SE); Sudheer Mygapula, Bangalore (IN); Nachiket Karmarkar, Bangalore (IN); Sasikumar Arumugam, Bangalore (IN); Bashkar Hv, Bangalore (IN); Ajit S. Vernekar, Bangalore (IN); Nityananda Maiya, Bangalore (IN); Prashanth Hosabettu Mohan, Bangalore (IN); Sasi Kumar Nutalapati, Bangalore (IN); Sameera Simha Hindupur, Bangalore (IN); Shashidhar Hedge, Bangalore (IN)

(73) Assignee: Cytiva Sweden AB, Uppsala (SE)

( * ) Notice: Subject to any disclaimer, the term of this patent is extended or adjusted under 35 U.S.C. 154(b) by 1452 days.

(21) Appl. No.: 16/077,779

(22) PCT Filed: Feb. 21, 2017

(86) PCT No.: PCT/EP2017/053874
§ 371 (c)(1),
(2) Date: Aug. 14, 2018

(87) PCT Pub. No.: WO2017/144440
PCT Pub. Date: Aug. 31, 2017

(65) Prior Publication Data
US 2020/0282361 A1    Sep. 10, 2020

(30) Foreign Application Priority Data

Feb. 26, 2016    (IN) .............................. 201611006767

(51) Int. Cl.
*F16K 7/06*    (2006.01)
*B01D 61/12*    (2006.01)
(Continued)

(52) U.S. Cl.
CPC ................ *F16K 7/06* (2013.01); *B01D 61/12* (2013.01); *B01D 61/22* (2013.01); *F16K 7/07* (2013.01);
(Continued)

(58) Field of Classification Search
CPC ..... F16K 7/06; F16K 7/07; F16K 7/04; B01D 61/12; B01D 61/22; B01D 2311/04;
(Continued)

(56) References Cited

U.S. PATENT DOCUMENTS 3,876,121 A * 4/1975 Preikschat ............... G05D 9/12
                                                    251/212
3,982,724 A * 9/1976 Citrin ....................... F16K 7/06
                                                    222/511
(Continued)

FOREIGN PATENT DOCUMENTS

CA            661174 A        4/1963
EP            0096973 A1      12/1983
(Continued)

OTHER PUBLICATIONS

PCT International Search Report and Written Opinion for PCT Application No. PCT/EP2017/053874 dated Oct. 4, 2017 (22 pages).

*Primary Examiner* — Liam Royce
(74) *Attorney, Agent, or Firm* — Eversheds-Sutherland (US) LLP (57) ABSTRACT

The invention discloses a method of controlling a transmembrane pressure (TMP) in a crossflow filtration apparatus, comprising the steps of: a) providing a crossflow filtration
(Continued)

apparatus comprising a pump (21) fluidically connected via a retentate compartment (33) of a crossflow filter (32) and a length of flexible tubing to a regulator valve (1; 101) acting on the flexible tubing, wherein the regulator valve is a high precision pinch valve. The apparatus further comprises a first pressure transducer (22) adapted to measure a pressure between the retentate compartment and the regulator valve, a second pressure transducer (39) adapted to measure a pressure between the pump and the retentate compartment and a third pressure transducer (40) adapted to measure a pressure at a permeate outlet (36) of the crossflow filter, and a control unit (23) electrically or electromagnetically connected to said regulator valve, the first, second and third pressure transducers and optionally to the pump; b) pumping a liquid with the pump via the second pressure transducer, through the retentate compartment via the length of flexible tubing, the first pressure transducer and the regulator valve; c) controlling the regulator valve with the control unit, such that a TMP calculated by formula (I) TMP=$(P_{inlet}+P_{outlet})/2-P_{perm}$ corresponds to a predetermined TMP value or to an interval between two predetermined TMP values, wherein $P_{inlet}$ is a pressure reading from the second pressure transducer, $P_{outlet}$ is a pressure reading from the first pressure transducer and $P_{perm}$ is a pressure reading from the third pressure transducer.

9 Claims, 8 Drawing Sheets

(51) Int. Cl.
  *B01D 61/22* (2006.01)
  *F16K 7/07* (2006.01)
  *G05D 16/20* (2006.01)
(52) U.S. Cl.
  CPC ...... *G05D 16/2013* (2013.01); *B01D 2311/04* (2013.01); *B01D 2311/08* (2013.01); *B01D 2311/14* (2013.01); *B01D 2313/18* (2013.01)

(58) Field of Classification Search
  CPC ............ B01D 2311/08; B01D 2311/14; B01D 2313/18; G05D 16/2013
  See application file for complete search history.

(56) References Cited

U.S. PATENT DOCUMENTS

| | | | | |
|---|---|---|---|---|
| 4,135,550 | A * | 1/1979 | Andersson | F16K 7/07 251/5 |
| 4,436,277 | A * | 3/1984 | Robak | F16K 7/06 251/9 |
| 4,693,131 | A * | 9/1987 | Teramachi | F16H 25/2204 74/89.32 |
| 4,936,980 | A * | 6/1990 | Harada | B01D 61/22 210/651 |
| 4,944,485 | A * | 7/1990 | Daoud | A61M 39/284 251/9 |
| 5,549,793 | A * | 8/1996 | Hellstrom | D21F 1/08 162/259 |
| 6,241,485 | B1 | 6/2001 | Warwick | |
| 6,267,559 | B1 * | 7/2001 | Mossman | F04B 43/082 417/44.1 |
| 2007/0170382 | A1 * | 7/2007 | Li | F16K 7/06 251/5 |
| 2010/0288385 | A1 * | 11/2010 | Gagne | F16K 31/0655 137/862 |
| 2015/0247114 | A1 * | 9/2015 | Gebauer | F04B 43/0081 435/243 |

FOREIGN PATENT DOCUMENTS

| | | |
|---|---|---|
| GB | 693028 | 6/1953 |
| WO | 03/085297 A1 | 10/2003 |
| WO | 2008/073020 A1 | 6/2008 |
| WO | 2011/003909 A1 | 1/2011 |
| WO | 2011/161609 A1 | 12/2011 |
| WO | 2015/029251 A1 | 3/2015 |

* cited by examiner

METHOD FOR PRESSURE CONTROL IN CROSSFLOW FILTRATION

CROSS REFERENCE TO RELATED APPLICATIONS

This application claims the priority benefit of PCT/EP2017/053874 filed on Feb. 21, 2017 which claims priority benefit of Indian Application No. 201611006767 filed Feb. 26, 2016. The entire contents of which are hereby incorporated by reference herein.

TECHNICAL FIELD OF THE INVENTION

The present invention relates to crossflow filtration and in particular to methods for pressure control in crossflow filtration systems with disposable flowpaths. The invention also relates to crossflow filtration systems with disposable flowpaths.

BACKGROUND OF THE INVENTION

In crossflow filtration a feed is passed through the retentate side of a crossflow filter and usually recycled in a retentate loop. Downstream the crossflow filter a throttling valve or clamp is used in the loop to generate a suitable back pressure such that liquid passes through the filter to a permeate compartment and can be collected as a permeate. An accurate control of the back pressure is needed to allow for high filtration rates as well as a reproducible and scalable process control without filter blockage or excessive concentration polarization. This is often achieved by the use of needle or diaphragm valves in conjunction with feedback loop, typically using a proportional integrative derivative (PID) controller.

Due to requirements of hygiene and sterility, filtration systems with disposable flowpaths are increasingly used in biopharmaceutical production and process development. Here, the disposable flowpath is often assembled from lengths of flexible tubing. With such flowpaths, pinch valves offer many advantages in that they allow control of liquid flows without any parts of the valve mechanism being in contact with the liquid and they can be mounted directly on the outside of the tubing. However, pinch valves are primarily used as on-off valves with only a fully open and a fully closed position and their use as regulating valves for precision control of back pressures has not been straightforward.

Accordingly there is a need for reliable methods to regulate back pressures in crossflow filtration systems using pinch valves.

SUMMARY OF THE INVENTION

One aspect of the invention is to provide a high precision pinch valve for regulation of back pressures. This is achieved with a valve as defined in the claims.

One advantage is that a rapid setup of the system and an accurate pressure control can be achieved. A further advantage is that the only wetted part of the control valve system is the flexible tubing, such that no expensive single-use components are needed.

A second aspect of the invention is the provision of a throttling assembly with a pinch valve for regulating back pressures. This is achieved with an assembly as defined in the claims.

A third aspect is to provide a well regulated crossflow filtration system with a disposable flowpath. This is achieved with a system as defined in the claims.

A fourth aspect is to provide a rapid and accurate method of regulating back pressures and transmembrane pressures in a crossflow filtration system with a disposable flowpath, hereby allowing for a reproducible and scalable control of processes. This is achieved with a method as defined in the claims.

Further suitable embodiments of the invention are described in the dependent claims.

DETAILED DESCRIPTION OF EMBODIMENTS

In one aspect, illustrated by FIGS. 1-5, the present invention discloses a pinch valve 1;101 for throttling a less. The actuator drive may e.g. comprise a stepper motor and a screw adapted to convert rotary motion of the stepper motor to linear motion of the actuator. To achieve the high precision, the stepper motor can have a small step angle, e.g. less than 4 degrees, less than 2 degrees or less than 1 degree, and the screw can be a low friction, high precision screw, e.g. a ball screw nut rotating with the motor and a threaded ball screw shaft providing the linear motion. An example of such a setup is the DRS 42 linear actuator from Oriental Motor Co. Ltd. (Japan).

Figure 1:
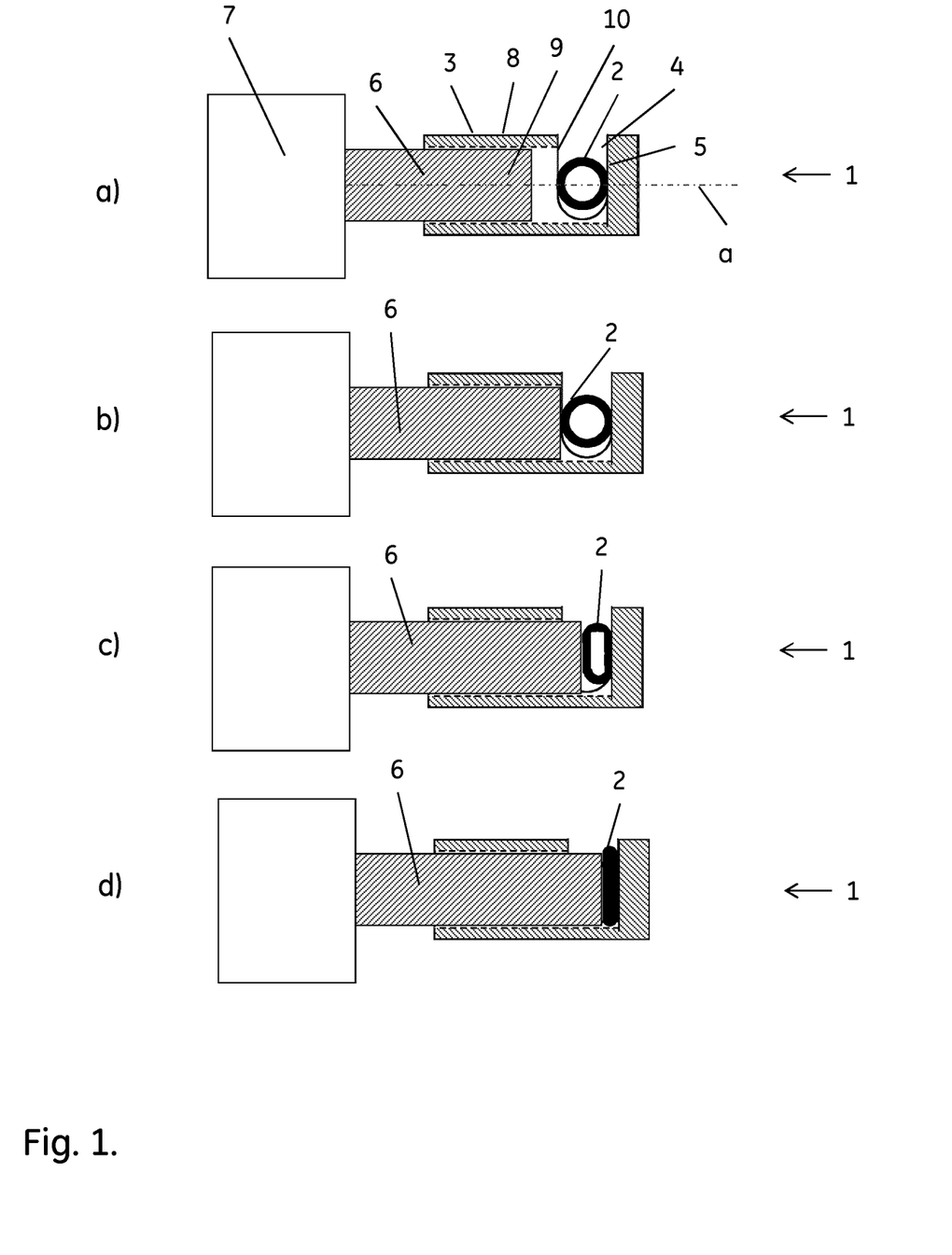
FIG. 1 shows a pinch valve of the invention, with the actuator in four different positions (side view, cross section of tubing): a) Fully open, tubing not in contact with actuator, b) Fully open, tubing in contact with actuator and valve seat, c) Partly open, tubing partly compressed by actuator, d) Fully closed, tubing completely compressed.
Figure 2:
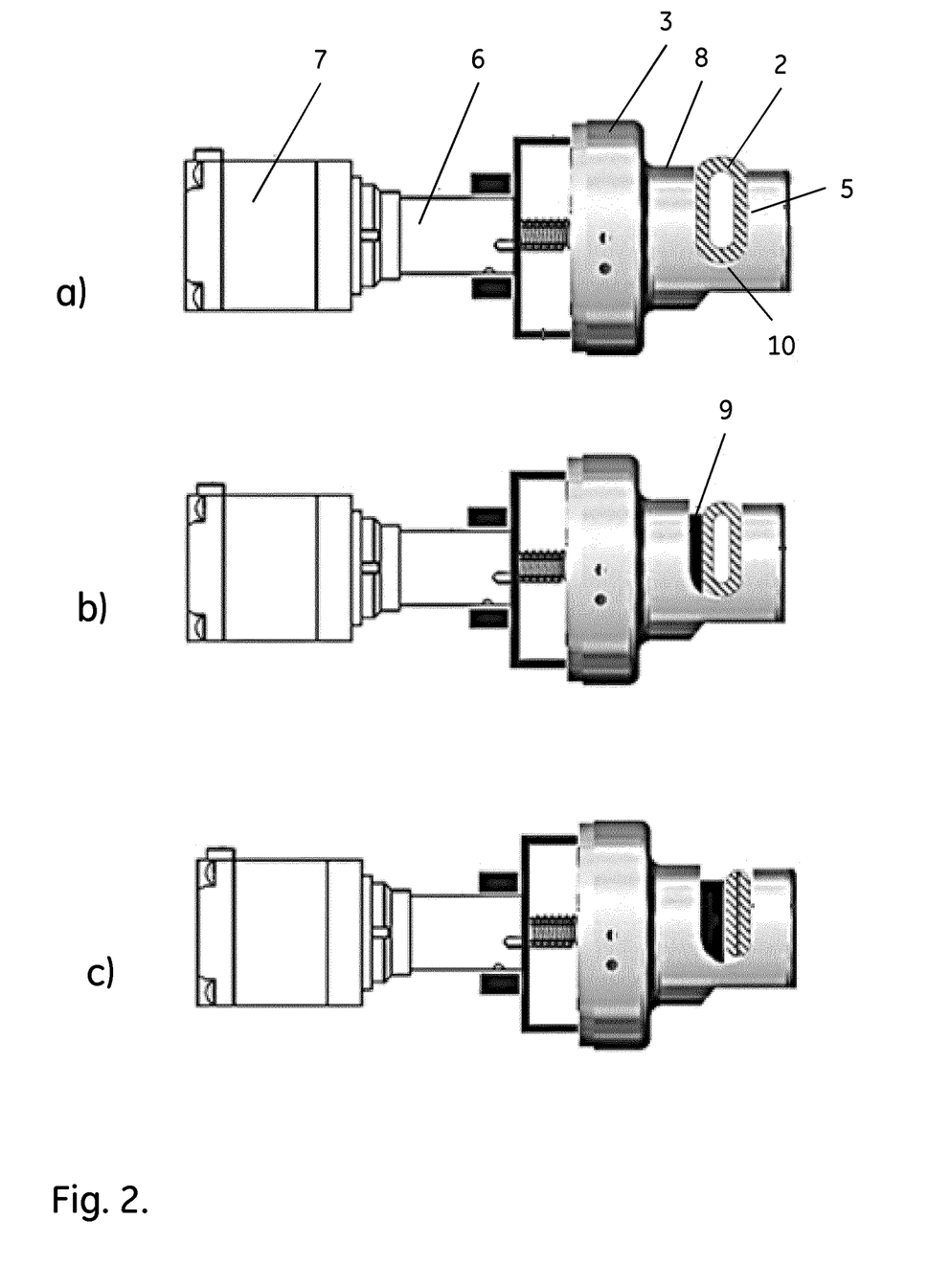
FIG. 2 shows the pinch valve of the invention in three different positions (side view, cross section of tubing): a) Fully open, b) Partly open, tubing partly compressed by actuator, c) Fully closed, tubing completely compressed.
Figure 3:
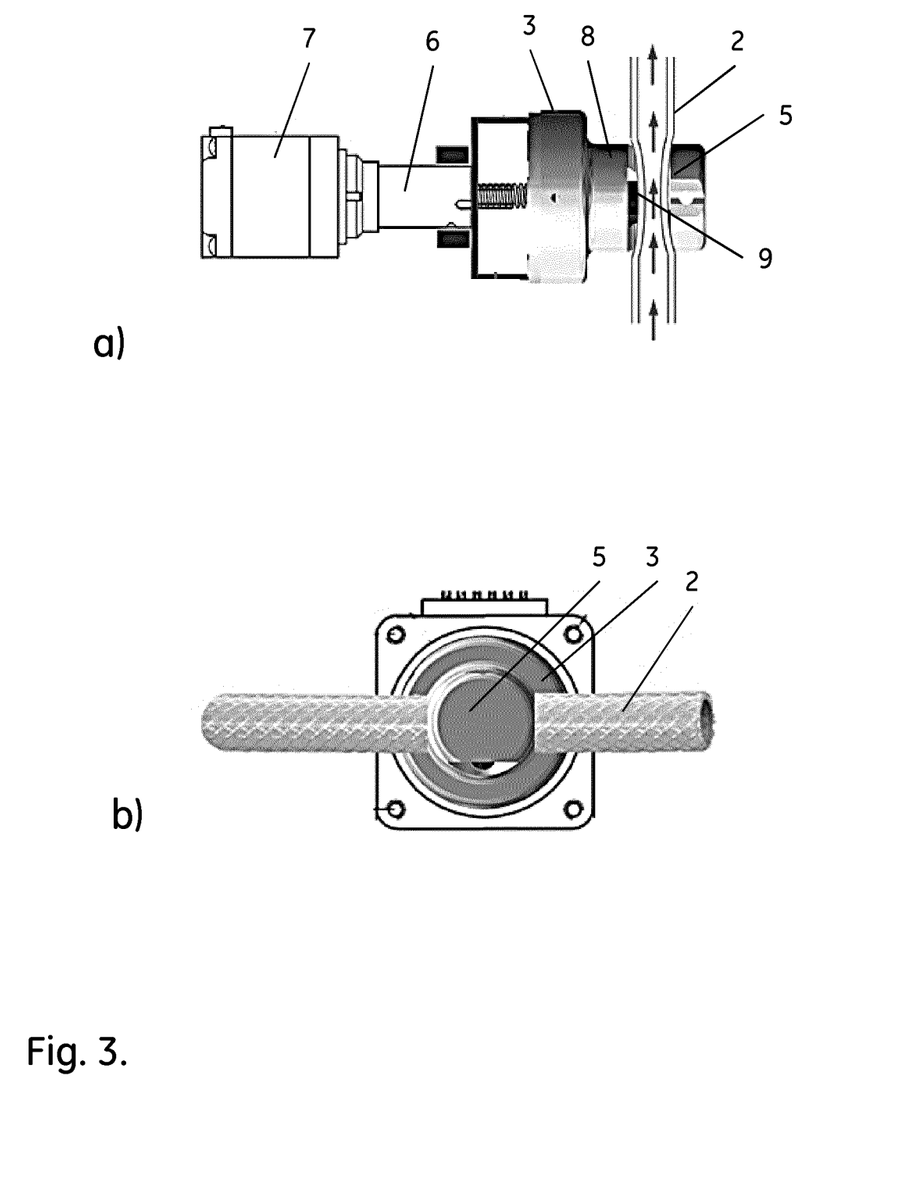
FIG. 3 shows the pinch valve of the invention: a) side view, longitudinal view of tubing, b) front view.
Figure 4:
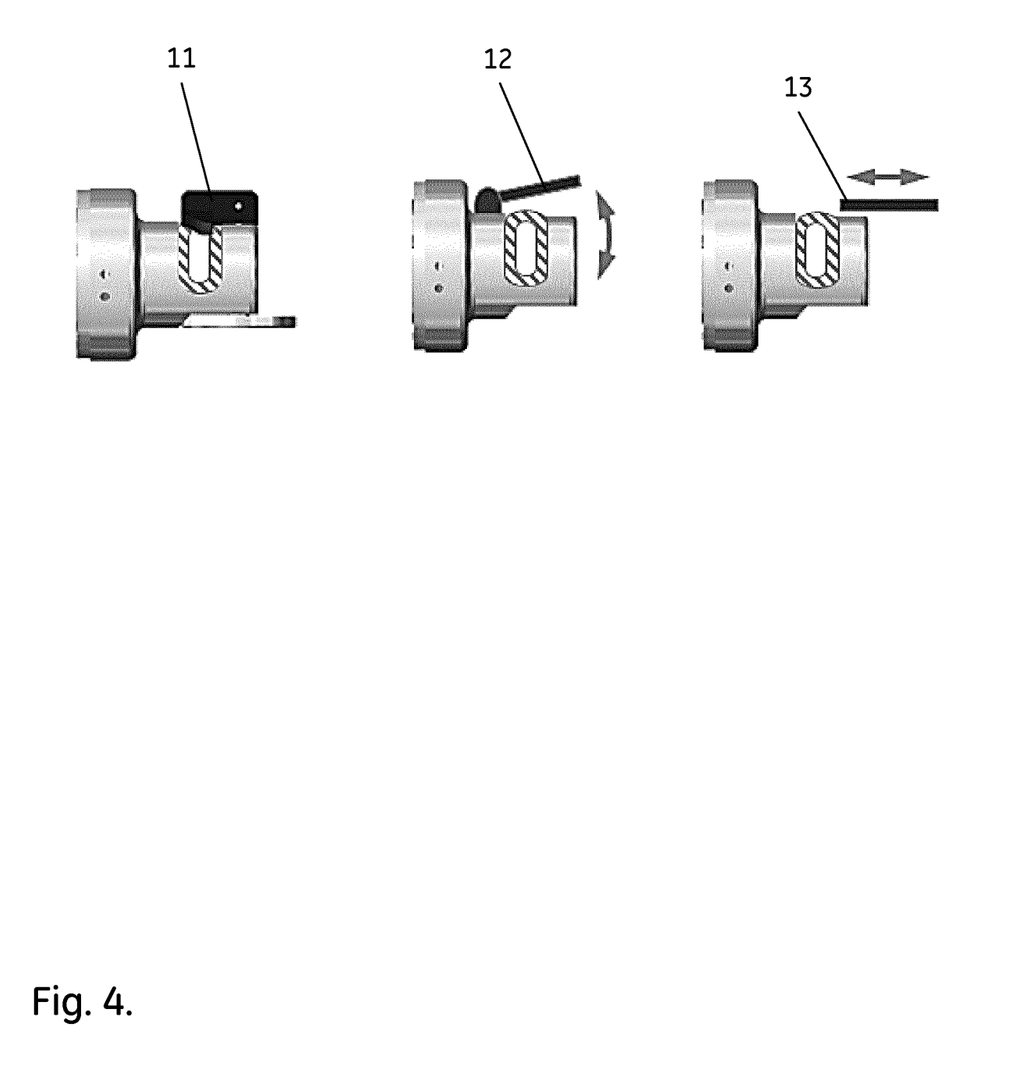
FIG. 4 shows the pinch valve of the invention with three different types of tubing latches.

In certain embodiments, illustrated by FIG. 1-4, a portion 8 of the valve body is tubular and the actuator may then comprise a plunger 9 movable inside the tubular portion in an axial direction a. The tubing holder may e.g. comprise a transverse recess 10 in the tubular portion of the valve body and the valve seat can then suitably be placed adjacent to the transverse recess. When placed in the transverse recess, the tubing may be initially compressed by the recess or it may be non-compressed, depending on the outer diameter of the tubing and the size of the recess. As illustrated in FIG. 4, the tubing holder may further comprise a tubing latch 11;12;13, arranged to lock the tubing in place in the holder. This keeps the tubing fixed in the tubing holder or transverse recess and prevents movements that might compromise the accuracy of the back pressure control. The latch can further function as a safety device, preventing operators from inserting fingers in the holder with the associated risk of pinching. The latch may e.g. comprise a pivotable 11;12 and/or axially movable 13 latch member or plate, arranged to cover an opening of the recess when in a closed position and to allow mounting and dismounting of the tubing when in an open position. The latch member/plate 11;12 may e.g. be pivotable around an axis orthogonal to the axial direction a.

Figure 5:
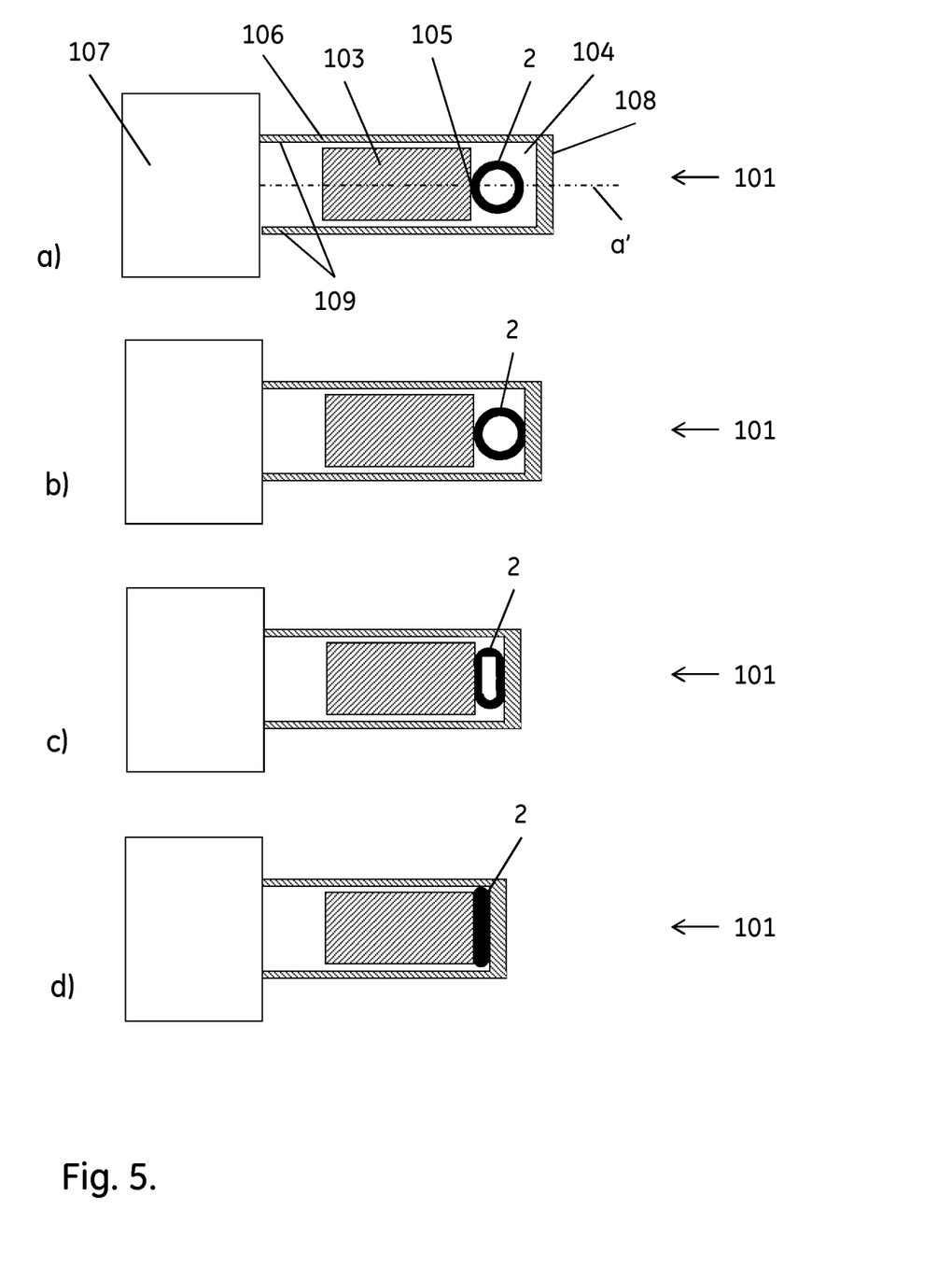
FIG. 5 shows an alternative pinch valve of the invention, with the actuator in four different positions: a) Fully open, tubing not in contact with actuator, b) Fully open, tubing in contact with actuator and valve seat, c) Partly open, tubing partly compressed, d) Fully closed, tubing completely compressed.

In some embodiments, illustrated by FIG. 5, the actuator 106 comprises a yoke 108, configured to compress flexible tubing in the tubing holder 104 against the valve seat 105, and actuator rods 109 movable by the actuator drive 107 in an axial direction a'. The tubing holder can be a space between the yoke and the valve seat, but the valve may also comprise further tubing holders.

Figure 6:
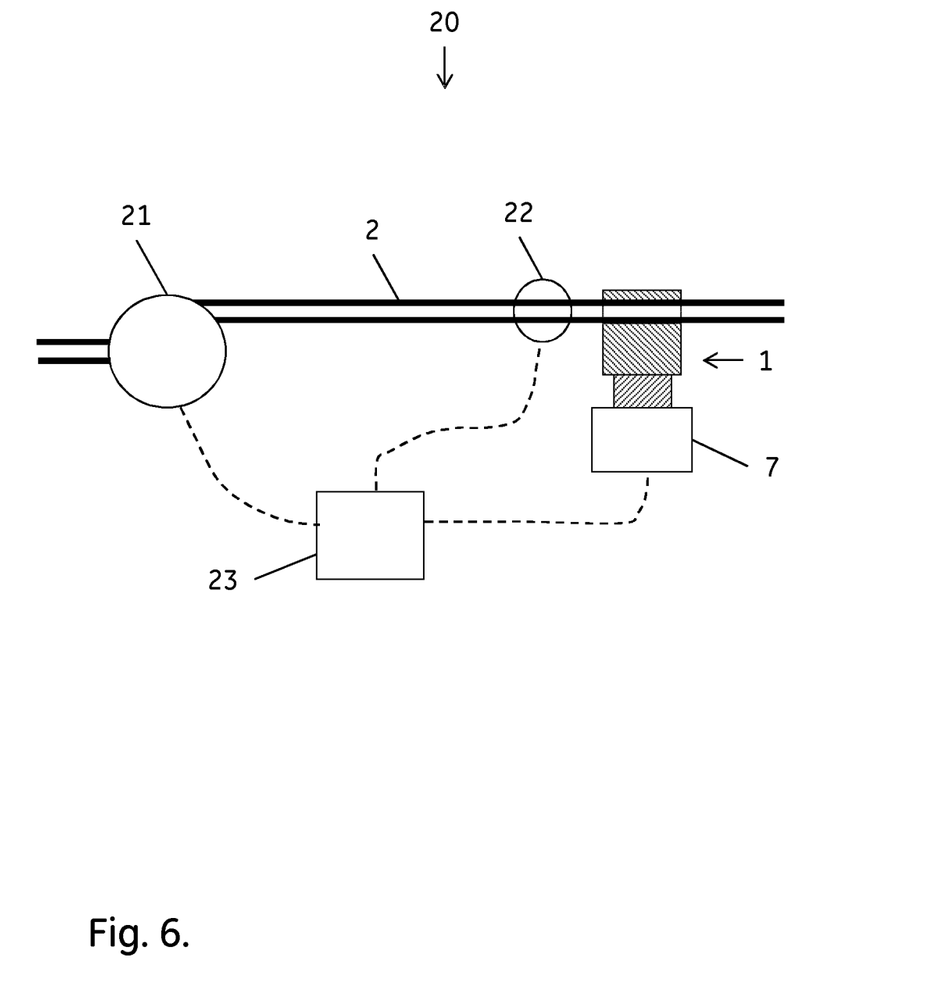
FIG. 6 shows a throttling assembly of the invention.

In a second aspect, illustrated by FIG. 6, the invention discloses a throttling assembly 20, which comprises a pump 21 (e.g. a peristaltic pump) fluidically connected to a length of flexible tubing 2 mounted in a pinch valve 1;101 as discussed above, or coupled to a membrane valve 201 (FIG. 8) as discussed below, and a first pressure transducer 22 adapted to measure a pressure in the length of tubing between the pump and the pinch or membrane valve. Liquid can then be pumped through the tubing and the flow can be throttled by the pinch/membrane valve 1;101;201, while the back pressure upstream of the pinch/membrane valve is monitored by the first pressure transducer. The first pressure transducer can suitably be an external transducer mounted on the outside of the flexible tubing. The flexible tubing 2 can e.g. have an outer diameter of up to 60, 30 or 20 mm, such as an outer diameter of 1-60 mm, 5-60 mm, 5-30 mm, 10-30 mm or 10-20 mm. The material of the flexible tubing can e.g. be rubber (such as silicone rubber), a thermoplastic elastomer or flexible PVC, with or without a braid reinforcement. The assembly may further comprise a control unit 23 electrically or electromagnetically connected to the actuator drive, the first pressure transducer and optionally to the pump. This allows control of the back pressure via the pinch/membrane valve and optionally the pump, e.g. by a feedback loop. The pinch/membrane valve 1;101;201 can be a pinch/membrane valve as disclosed above/below, where the actuator drive 7;107;207 is capable of positioning said actuator with an accuracy of 10 micrometers or less, such as 5 micrometers or less or even 2 micrometers or less.

Alternatively the pinch or membrane valve actuator drive 7;107;207 can be a pneumatic or hydraulic drive, capable of applying a force on the actuator 6;106 with an accuracy of 5 N or less, such as 1 N or less, in an axial direction a;a' to compress the tubing/membrane. An example of such an actuator drive is a pneumatic pinch or membrane valve with the air pressure regulated using a Norgren VP50 (IMI Norgren Ltd) proportional air pressure controller. Suitably, the actuator drive can be a double acting pneumatic cylinder mounted on a pinch valve (or a membrane valve), where during pressure regulation the air pressure acts in a closing direction acting against the elasticity of the flexible tubing/membrane and when no regulation takes place (e.g. during replacement of the tubing set), the valve is opened by application of air pressure to the cylinder in an opening direction. A single acting cylinder with spring release could in principle also be used, but the double acting cylinder provides smoother movement in both directions, resulting in pressure regulation with better precision. The double acting pneumatic cylinder can suitably have a low minimum operating pressure to allow a high sensitivity of the regulation. The minimum operating pressure can e.g. be 0.01 MPa or less, such as 0.005 MPa or less. An example of such a cylinder is the MQQTB25-20D cylinder from SMC Pneumatics, with an operating pressure range of 0.005-0.5 MPa.

Figure 7:
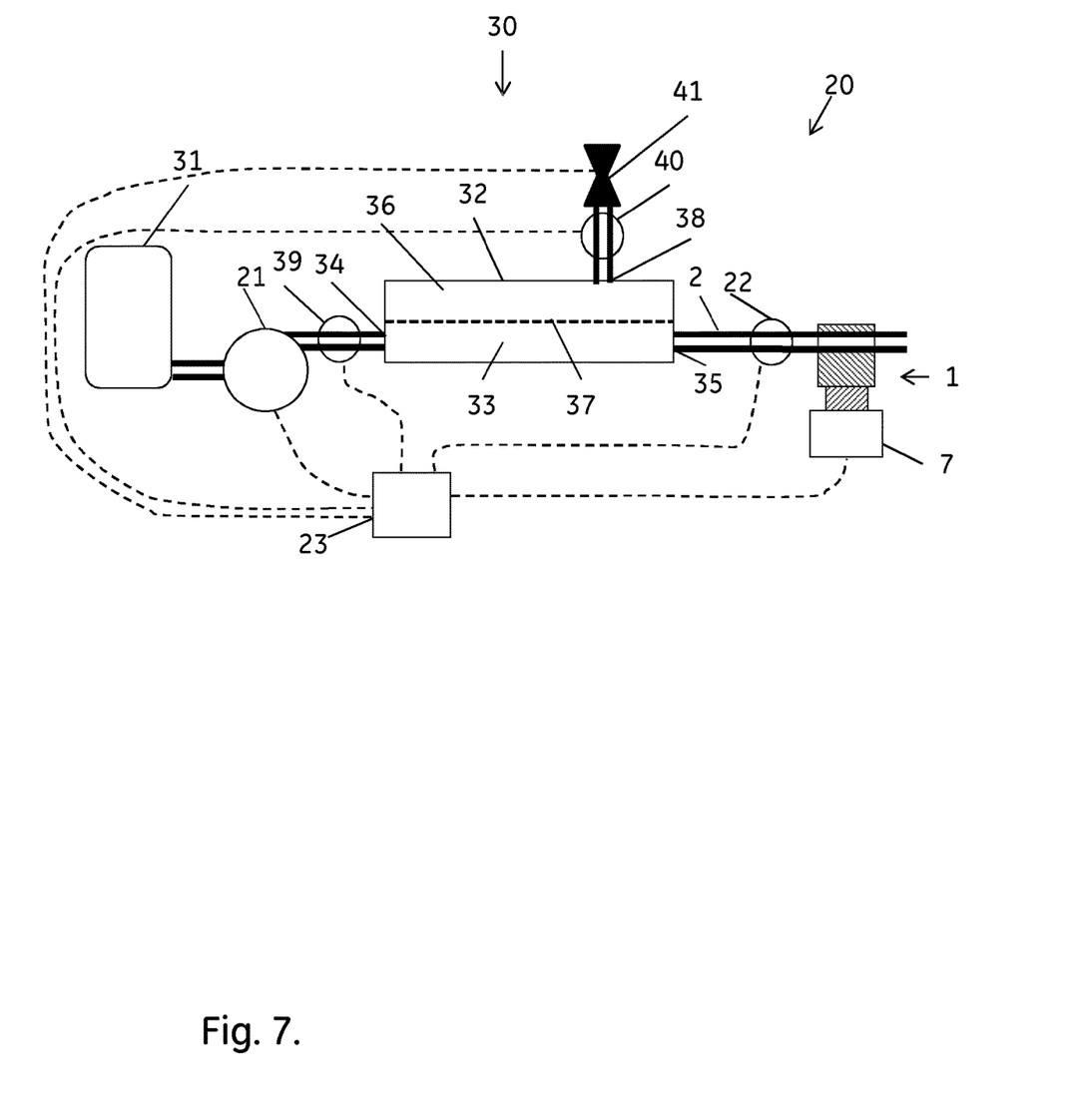
FIG. 7 shows a crossflow filtration system of the invention.

In a third aspect, illustrated by FIG. 7, the invention discloses a crossflow filtration apparatus 30, comprising a throttling assembly 20 as discussed above, a feed reservoir 31 fluidically connected to the pump and a crossflow filter 32. The crossflow filtration apparatus can suitably have a disposable flowpath, e.g. such that all wetted parts are disposable/single use components. The crossflow filter has a retentate compartment 33 with a retentate inlet 34 and a retentate outlet 35, a permeate compartment 36 delimited from the retentate compartment by a filter medium 37 and a permeate outlet 38, wherein the retentate inlet is fluidically connected to the pump and the retentate outlet is fluidically connected to the length of flexible tubing via the first pressure transducer to the pinch valve. The crossflow filter can e.g. be a hollow fiber cartridge or one or more flatsheet filter cassettes and the filter medium may e.g. be a microfiltration or ultrafiltration membrane. Further, the filtration apparatus may comprise a second pressure transducer 39 adapted to measure a pressure at the retentate inlet and a third pressure transducer 40 adapted to measure a pressure at the permeate outlet. The apparatus may also comprise a control unit 23 electrically or electromagnetically connected to the actuator drive, the first, second and third pressure transducers and optionally to the pump. Additionally, the apparatus may comprise a permeate control valve 41, located between the permeate outlet and the third pressure transducer. The permeate control valve 41 may be employed to control the pressure or the flow rate of the liquid at the permeate outlet 38 or downstream of outlet 38. The feed reservoir can e.g. be a flexible bag and the first, second and/or third pressure transducers may be external transducers mounted on the outside of flexible tubing. In a typical crossflow filtration system, the retentate or a fraction of the retentate exiting the crossflow filter at the retentate outlet 35 can be returned to the feed reservoir.

In a fourth aspect, the invention discloses a method of controlling a pressure in a length of flexible tubing. The method comprises the steps of:
a) providing the throttling assembly as discussed above or the crossflow filtration apparatus discussed above;
b) pumping a liquid with the pump through the length of flexible tubing via the first pressure transducer and the pinch valve;
c) determining a first actuator position, where the actuator contacts the flexible tubing or membrane, without compressing it, and the flexible tubing or membrane contacts the valve seat;
d) moving the actuator to the first actuator position;
e) moving the actuator to a second actuator position where the tubing/membrane is partly compressed by the actuator, such that a pressure reading from the first pressure transducer corresponds to a predetermined pressure value or to an interval between two predetermined pressure values.

The first actuator position may e.g. be determined according to one of the below methods:
i) Determining the first actuator position as the position where the pressure reading from the first pressure transducer starts to increase from a baseline level where the actuator is not in contact with the tubing/membrane. This may e.g. be done by taking the first actuator position as the position where the pressure reading deviates from the baseline by a predetermined differential value. Alternatively, the pressure reading may be recorded as a function of the position and the first actuator position determined by curve-fitting or graphical means, e.g. as an intersection between a linear representation of the baseline and a tangent to the rising part of the curve.

ii) If the actuator or the valve seat comprises a force transducer capable of measuring a compression force acting on said tubing/membrane; or the said stepper motor comprises a torque or motor load transducer; the first actuator position can be determined as the position where the compression force reading from the force transducer or the reading from the torque or motor load transducer starts to increase from a baseline level where the actuator is not in contact with the tubing/membrane. The calculations may be made by methods analogue to those under i) above.

iii) With a pneumatically or hydraulically driven pinch valve, the first position can be determined as the position where the force applied to the actuator is sufficient to produce a pressure reading from the first pressure transducer that starts to increase from a baseline level where the actuator is not in contact with the tubing/membrane. The calculations may be made by methods analogue to those under i) above.

iv) The first actuator position can also be calculated from the dimensions of the pinch valve and the outer diameter of the tubing.

In some embodiments, the actuator is moved in step d) at a first actuator velocity and in step e) at a second actuator velocity, and wherein the second actuator velocity can e.g. be at least 50% lower than the first actuator velocity. This allows for a rapid control with high accuracy. The second actuator velocity may also be variable, e.g. by a linear or non-linear ramping. The second actuator velocity may e.g. be 90-100%, e.g. 100%, of the first actuator velocity at the first actuator position and then be ramped, e.g. linearly ramped, downwards to 0-10%, e.g. 0%, of the first actuator velocity at an actuator position where the valve is completely closed. An advantage of ramping down the velocity is that the risk for overshooting is diminished.

In some embodiments the method can be used to control a transmembrane pressure (TMP) in a crossflow filtration system. The method can then comprise the steps of:
a) providing the crossflow filtration apparatus as discussed above;
b) pumping a liquid with the pump via the second pressure transducer, through the retentate compartment via the length of flexible tubing, the first pressure transducer and the pinch valve;
c) determining a first actuator position, where the actuator contacts the flexible tubing/membrane, without compressing it, and the flexible tubing contacts the valve seat;
d) moving the actuator to the first actuator position;
e) moving the actuator to a second actuator position where the tubing/membrane is partly compressed by the actuator, such that a TMP calculated by formula I $$TMP=(P_{inlet}+P_{outlet})/2-P_{perm} \quad (I)$$

corresponds to a predetermined TMP value or to an interval between two predetermined TMP values, wherein $P_{inlet}$ is a pressure reading from the second pressure transducer, $P_{outlet}$ is a pressure reading from the first pressure transducer and $P_{perm}$ is a pressure reading from the third pressure transducer. The first actuator position may e.g. be determined according to one of the methods i)-iv) discussed above.

In some embodiments, the actuator is moved in step d) at a first actuator velocity and in step e) at a second actuator velocity, and wherein the second actuator velocity can e.g. be at least 50% lower than the first actuator velocity. This allows for a rapid control with high accuracy. The second actuator velocity may also be variable, e.g. by a linear or non-linear ramping. The second actuator velocity may e.g. be 90-100%, e.g. 100%, of the first actuator velocity at the first actuator position and then be ramped, e.g. linearly ramped, downwards to 0-10%, e.g. 0%, of the first actuator velocity at an actuator position where the valve is completely closed. An advantage of ramping down the velocity is that the risk for overshooting is diminished.

In certain embodiments, the crossflow filtration apparatus is equipped with pressure sensors and/or pressure signal processing capabilities that allow for a fast and pulsation free monitoring of pressures. A fast and pulsation free monitoring of pressure is highly advantageous for achieving a fast, stable and robust feedback control of pressures when using the pressure control valves of the invention. In a specific embodiment, the pressure sensors and/or the signal processing provides a response time of less than 5 seconds for a step change in pressure, suitably less than 3 seconds. The pressure sensors and/or the signal processing can suitably provide signals that have a pulsation and thereby a temporary deviation not larger than 5%, such as not larger than 2%, from the actual value of the averaged pressure signal when running the apparatus at constant flow rate at steady state.

Figure 8:
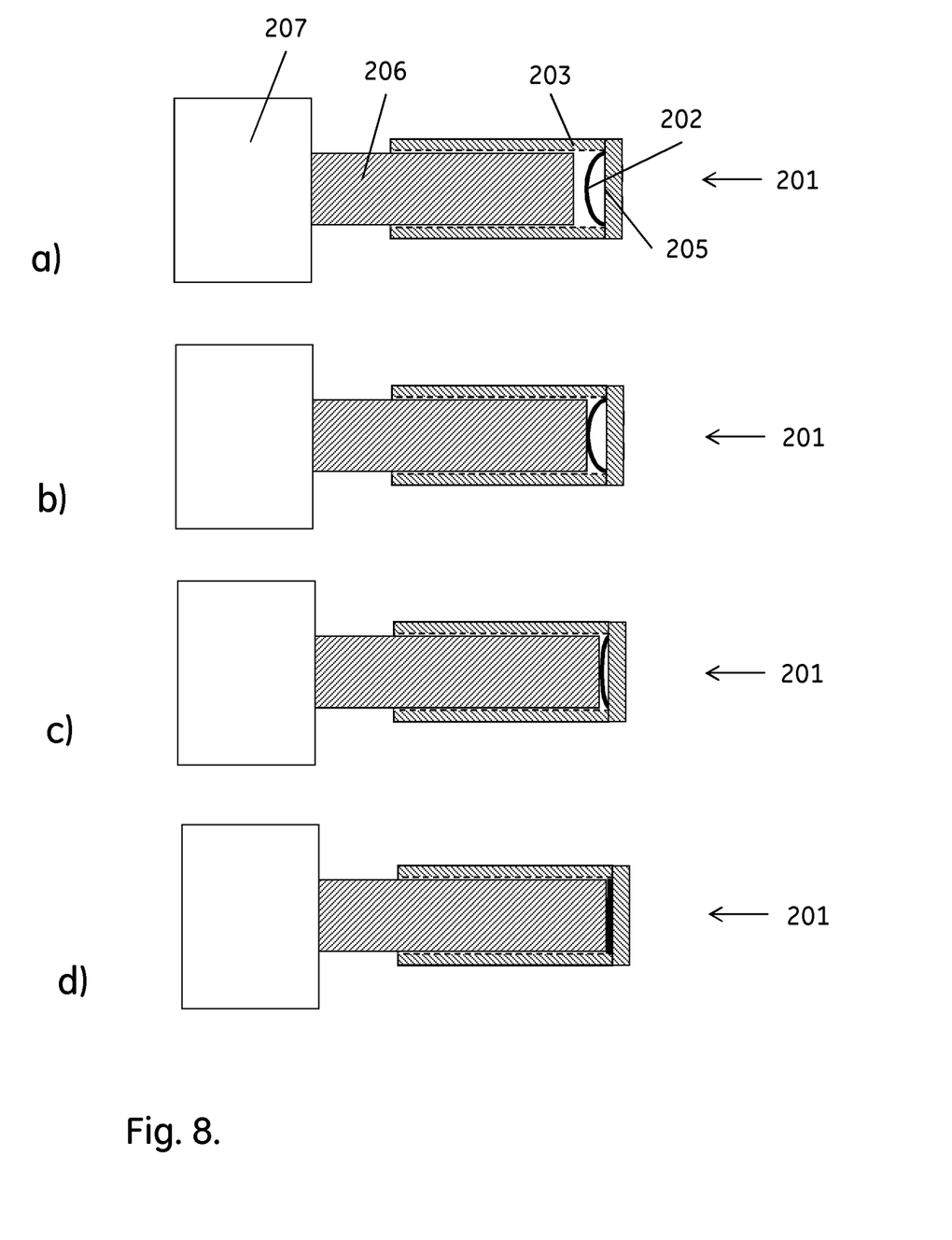
FIG. 8 shows an alternative membrane valve of the invention, with the actuator in four different positions: a) Fully open, membrane not in contact with actuator, b) Fully open, membrane in contact with actuator, c) Partly open, membrane partly compressed, d) Fully closed, membrane completely compressed.

The invention also discloses a method of controlling a transmembrane pressure (TMP) in a crossflow filtration apparatus, comprising the steps of:
a) providing a crossflow filtration apparatus comprising a pump 21 fluidically connected via a retentate compartment 33 of a crossflow filter 32 and a length of flexible tubing to a regulator valve 1;101 acting on the flexible tubing, wherein the regulator valve is a pinch valve as discussed above. The apparatus further comprises a first pressure transducer 22 adapted to measure a pressure between said retentate compartment and the regulator valve, a second pressure transducer 39 adapted to measure a pressure between the pump and the retentate compartment and a third pressure transducer 40 adapted to measure a pressure at a permeate outlet 36 of the crossflow filter, and a control unit 23 electrically or electromagnetically connected to the regulator valve, the first, second and third pressure transducers and optionally to the pump;
b) pumping a liquid with the pump via the second pressure transducer, through the retentate compartment via the length of flexible tubing, the first pressure transducer and the regulator valve;
c) controlling the regulator valve with the control unit, such that a TMP calculated by formula I $$TMP=(P_{inlet}+P_{outlet})/2-P_{perm} \quad (I)$$

corresponds to a predetermined TMP value or to an interval between two predetermined TMP values, wherein $P_{inlet}$ is a pressure reading from the second pressure transducer, $P_{outlet}$ is a pressure reading from the first pressure transducer and $P_{perm}$ is a pressure reading from the third pressure transducer. The regulator valve can suitably be a pinch valve of one of the types discussed above. Alternatively, the regulator valve can be a membrane valve 201 with a disposable (single-use) valve body 203 and an actuator 206 compressing a membrane 202 in the valve body towards a valve seat 205. The actuator can be driven by an actuator drive 207 capable of positioning the actuator with an accuracy of 10 micrometers or less, such as 5 micrometers or less or even 2 micrometers or less. The actuator drive may e.g. comprise a stepper motor and a screw adapted to convert rotary motion of the stepper motor to linear motion of the actuator. To achieve the high precision, the stepper motor can have a small step angle, e.g. less than 4 degrees, less than 2 degrees or less than 1 degree, and the screw can be a low friction, high precision screw, e.g. a ball screw nut rotating with the motor and a threaded ball screw shaft providing the linear motion. An example of such a setup is the DRS 42 linear actuator from Oriental Motor Co. Ltd. (Japan).

Alternatively, or additionally, the regulator valve may be used to control the flow rate through the retentate compartment.

Further, the invention discloses a method of controlling a TMP in a crossflow filtration apparatus, comprising the steps of:
a) providing a crossflow filtration apparatus comprising a pump 21 fluidically connected via a retentate compartment 33 of a crossflow filter 32 and a length of flexible tubing to a regulator valve 1;101 acting on the flexible tubing, said apparatus further comprising a first pressure transducer 22 adapted to measure a pressure between the retentate compartment and the regulator valve, a second pressure transducer 39 adapted to measure a pressure between the pump and the retentate compartment and a third pressure transducer 40 adapted to measure a pressure at a permeate outlet 36 of the crossflow filter, a permeate control valve 41 adapted to regulate a back pressure of a flow through the permeate outlet, and a control unit 23 electrically or electromagnetically connected to the permeate control valve, the first, second and third pressure transducers and optionally to the pump and/or regulator valve;
b) pumping a liquid with the pump via the second pressure transducer, through the retentate compartment via the length of flexible tubing, the first pressure transducer and the regulator valve;
c) setting an approximate value of $P_{outlet}$ by the regulator valve with the control unit and controlling $P_{perm}$ with the permeate control valve, such that a TMP calculated by formula I $$TMP = (P_{inlet} + P_{outlet})/2 - P_{perm} \qquad (I)$$

corresponds to a predetermined TMP value or to an interval between two predetermined TMP values, wherein $P_{inlet}$ is a pressure reading from the second pressure transducer, $P_{outlet}$ is a pressure reading from the first pressure transducer and $P_{perm}$ is a pressure reading from the third pressure transducer. The regulator valve may be a pinch valve, e.g. of one of the types discussed above, but it may also be e.g. a manually controlled screw clamp or a membrane valve. The permeate control valve can suitably be a pinch valve of one of the types discussed above.

Alternatively, or additionally, the permeate control valve may be used to control the flow rate of permeate from the permeate outlet or to control the pressure of the permeate at or downstream of the permeate outlet.

Further, the invention discloses a crossflow filtration apparatus and its use employing a pressure control valve according to the invention and a method for feedback control of pressure or the transmembrane pressure that is controlling a pressure or the transmembrane pressure with an accuracy better than 2% (measured as deviation between averaged pressure or transmembrane pressure at steady and stable control), such as better than 1%.

Further, the invention discloses a crossflow filtration apparatus and its use employing a pressure control valve according to the invention and a method for feedback control of pressure or the transmembrane pressure that is controlling a step change of pressure or the transmembrane pressure with a response time of less than 1 minute without any overshoot larger than 10% of the target value and pressure.

Further, the invention discloses a crossflow filtration apparatus and its use employing a pressure control valve according to the invention and a method for feedback control of pressure or the transmembrane pressure that is controlling a pressure or transmembrane pressure without pulsation and thereby a temporary deviation not larger than 5%, preferably not larger than 2%, from the actual value of the averaged pressure signal when running the apparatus at constant flow rate at steady state.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All patents and patent applications mentioned in the text are hereby incorporated by reference in their entireties as if individually incorporated.

The invention claimed is:

1. A crossflow filtration apparatus comprising a crossflow filter and a throttling assembly, the throttling assembly comprising:
   a pump fluidically connected to a length of flexible tubing mounted in the pinch valve, the length of flexible tubing being coupled to the crossflow filter, the pinch valve comprising:
   a valve body with a tubing holder,
   a valve seat,
   an actuator adapted to compress the flexible tubing in said tubing holder against said valve seat, and
   a pneumatic or hydraulic actuator drive, and
   a first pressure transducer adapted to measure a pressure in said length of tubing between said pump and said pinch valve, and
   wherein the actuator is configured to move between a plurality of actuator positions at variable actuator velocities.

2. The crossflow filtration apparatus of claim 1, further comprising a control unit electrically or electromagnetically connected to said actuator drive, said first pressure transducer and optionally to said pump.

3. The crossflow filtration apparatus of claim 1, wherein said actuator drive is capable of positioning said actuator with an accuracy of 10 micrometers or less.

4. The crossflow filtration apparatus of claim 3, wherein said actuator drive is capable of positioning said actuator with an accuracy of 5 micrometers or less.

5. The crossflow filtration apparatus of claim 4, wherein said actuator drive is capable of positioning said actuator with an accuracy of 2 micrometers or less.

6. The crossflow filtration apparatus of claim 1, wherein the tubing holder further comprises a tubing latch configured to lock the tubing in place in the holder.

7. The crossflow filtration apparatus of claim 1, wherein the plurality of actuator positions comprise:
 a first actuator position wherein the actuator contacts the flexible tubing without compressing it; and
 a second actuator position wherein the flexible tubing is partly compressed by the actuator; and
wherein the variable velocities comprise:
 a first velocity at which the actuator moves from a position in which the actuator does not contact the flexible tubing to the first actuator position; and
 a second velocity at which the actuator moves from the first actuator position to the second actuator position, wherein the second velocity is lower than the first velocity.

8. The crossflow filtration apparatus of claim 1, wherein the pneumatic or hydraulic actuator drive is capable of applying a force on the actuator with an accuracy of 5 N or less.

9. The crossflow filtration apparatus of claim 1, wherein the pneumatic or hydraulic actuator drive is capable of applying a force on the actuator with an accuracy of 0.2 N or less.

\* \* \* \* \*